United States Patent

Evers et al.

[15] 3,652,900
[45] Mar. 28, 1972

[54] RADIATION TOLERANT RELAY CONTROL SYSTEM

[72] Inventors: Theodore H. Evers, Highland; Eric K. Pritchard, Adelphi, both of Md.

[73] Assignee: The United States of America as represented by the Secretary of the Navy

[22] Filed: Aug. 19, 1969

[21] Appl. No.: 851,413

[52] U.S. Cl. .......................317/148.5 R, 307/267, 307/275, 317/146
[51] Int. Cl. .........................................H01h 47/32
[58] Field of Search.............317/146, 147, DIG. 4; 331/112; 307/129, 267, 275

[56] References Cited

UNITED STATES PATENTS

| | | | |
|---|---|---|---|
| 2,745,012 | 5/1956 | Felker | 331/112 |
| 3,002,110 | 9/1961 | Hamilton | 307/275 X |
| 3,147,407 | 9/1964 | Warner et al. | 317/148.5 R X |
| 3,154,725 | 10/1964 | Kadah | 317/141 S |
| 3,233,124 | 2/1966 | Favin | 331/112 X |
| 3,296,486 | 1/1967 | Nienhuis | 331/112 X |

*Primary Examiner*—William M. Shoop, Jr.
*Assistant Examiner*—Harry E. Moose, Jr.
*Attorney*—R. S. Sciascia and J. A. Cooke

[57] ABSTRACT

A radiation tolerant relay control system having a threshold amplifier, blocking oscillator and relay driver for actuating a relay winding. A flyback path from the blocking oscillator to the relay winding augments the duty cycle to insure that a predetermined number of input pulses occurring within a time period will energize the relay winding and effect relay operation.

2 Claims, 9 Drawing Figures

Theodore H. Evers
Eric K. Pritchard
INVENTORS

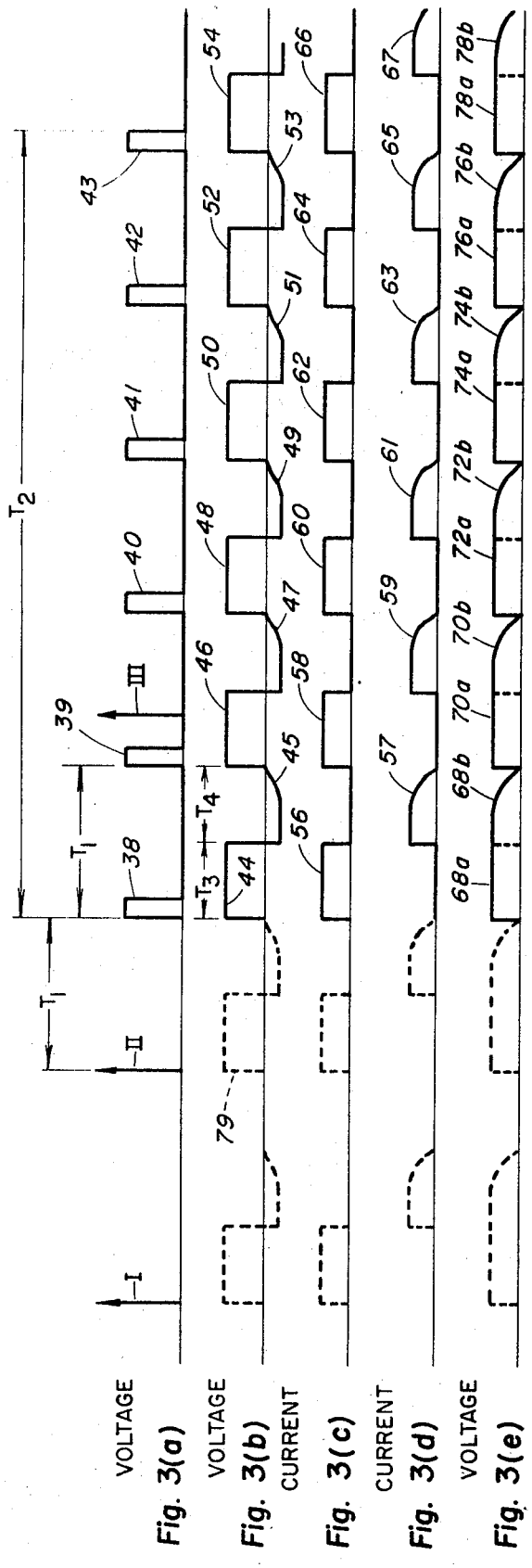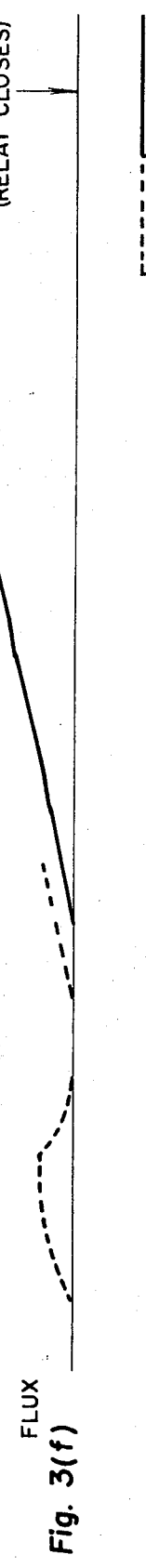

RADIATION TOLERANT RELAY CONTROL SYSTEM

BACKGROUND OF THE INVENTION

This invention relates generally to relay control circuitry and more particularly to a radiation hardened relay control system.

System hardening may be broadly defined as any technique utilized in obtaining radiation tolerant systems, that is systems unaffected by exposure to gamma radiation or the like. The presence of such radiation, absent hardening techniques, will cause premature or otherwise undesirable operation of circuit systems utilizing semiconductor circuit components. Thus, in the case of a switching system which may include a semiconductive circuit component utilized as the switching element, a single pulse caused by gamma or other nuclear radiation may cause the semiconductive component to effect premature switch operation.

To overcome undesirable operation of systems employing semiconductor devices subjected to gamma radiation certain system hardening techniques have been devised. These hardening techniques have been varied and have included cancellation, time sequencing, circumvention and modification of the environment. These heretofore employed techniques are somewhat unreliable, expensive, or otherwise inadequate and therefore, have been unable to provide systems adequately immune to gamma or other nuclear radiation. Thus, it is apparent that prior art switching systems, utilizing a semiconductive element as the switching element, have required complex and expensive hardening techniques to obviate the possibility of a single gamma burst adversely effecting circuit operation by causing premature switch operation.

SUMMARY OF THE INVENTION

Accordingly, one object of the invention is to provide a circuit switching system immune to a radiation environment.

Another object of the invention is to provide a radiation tolerant relay control circuit utilizing semiconductive elements.

A still further object of the present invention is to provide an electronic control circuit resistant to gamma radiation.

These and other objects are obtained by providing a switching system including an electromechanical relay as the switching member. A predetermined number of input pulses must be applied to the system within a predetermined time before the relay is actuated insuring, therefore, that a single gamma burst will not actuate the relay.

BRIEF DESCRIPTION OF THE DRAWING

A more complete understanding of the invention and many of the attendant advantages thereof will be readily appreciated as the same becomes better understood by reference to the following detailed description when considered in connection with the accompanying drawings wherein:

FIGS. 3a —3g are graphical views showing various signal waveforms in the system of the present invention.

DESCRIPTION OF THE PREFERRED EMOBODIMENT

Figure 1:
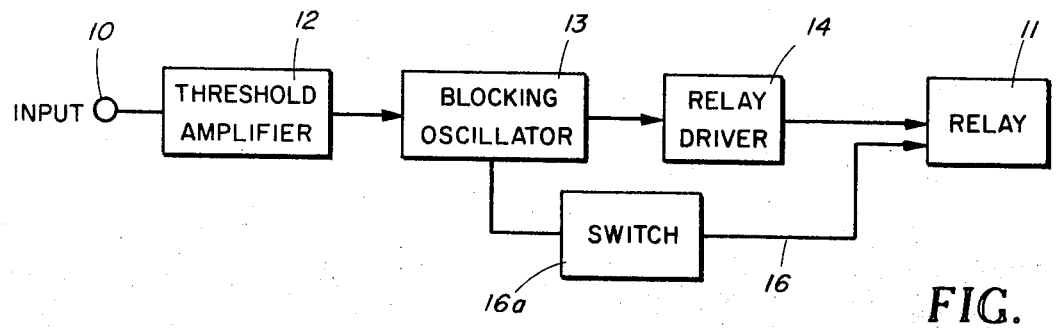
FIG. 1 is a block diagrammatic view of the radiation hardened relay control system according to one embodiment of the present invention.

Referring now to the drawings, wherein like reference numerals designate corresponding elements throughout, and more particularly to FIG. 1 thereof, the radiation hardened relay control system is shown as including an input terminal 10 adapted, as hereinafter explained, to receive input pulses of electrical energy from a pulse source (not shown) to actuate a relay 11. By way of example, relay 11 may be a "Golden G" relay, Model Number G6C1CB26AS, manufactured by Filtors, Inc. As previously explained, one disadvantage of prior art switch systems utilizing a semiconductive component, such as a SCR or the like, as the circuit switching element is that exposure to a single gamma burst may trigger the component to effect circuit switching. The present invention obviates this difficulty by utilizing relay 11 which requires the application of a predetermined number of input pulses before it is actuated to effect circuit operation. The input pulses are delivered to the input terminal 10 and effect operation of the relay by way of a threshold amplifier 12, a blocking oscillator 13 and a relay driver 14 connected therebetween. As hereinafter more fully discussed, blocking oscillator 13 provides current control pulses, during the regeneration or "ON" operation period, to activate the relay driver thereby completing at least one circuit path to connect a voltage supply to the core winding of the relay. During the "OFF" or flyblack interval of the blocking oscillator, the blocking oscillator completes another circuit path to connect the voltage supply to the core winding. The flyback path 16 may include a switch component 16a to augment the blocking oscillator duty cycle as will hereinafter be explained.

Figure 2:
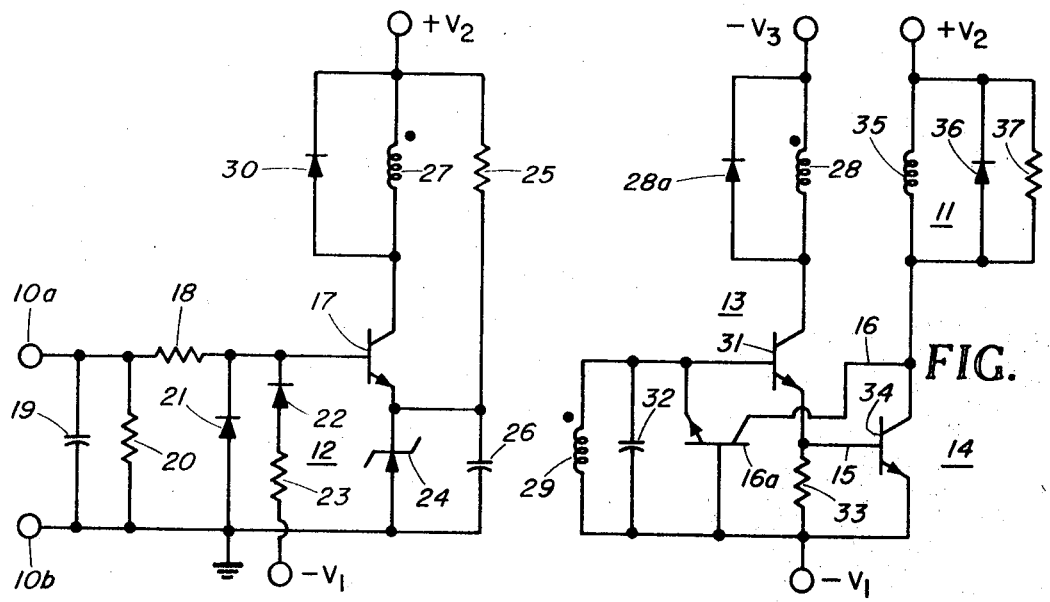
FIG. 2 a —schematic view of the radiation hardened relay control system according to one embodiment of the present invention.

Referring now to FIG. 2 of the drawing, the threshold amplifier 12 is shown as including a transistor 17 the base of which is connected to input terminal 10a by way of resistor 18. Parallel connected across input terminals 10a and 10b, are a capacitor 19 and a resistor 20. The parallel connected resistor and capacitor serve to integrate the input pulses on the input terminals before passing them to transistor 17. Resistor 18 limits the base current in the transistor while a diode 21, connected at one end to the junction of resistor 18 and the base of transistor 17 and at the other end to input terminal 10b, which may be ground, may advantageously shunt any negative pulses at 10a to ground. A series connected diode 22 and a resistor 23 are connected between the base of transistor 17 and a terminal connectable to a supply voltage −V1. By way of example, −V1 may be of a magnitude of −21 volts. Diode 22 and resistor 23 act as a radiation compensator which draws any induced collector-base leakage in transistor 17 away from the transistor's base-emitter junction thereby insuring that any leakage current in the collector-base circuit will not be multiplied by the beta of the transistor to adversely effect the base-emitter circuit. For noise rejection, a breakdown semiconductive device, such as a Zener diode 24 is connected between the emitter of transistor 17 and ground and a resistor 25 is connected to the Zener diode and a terminal which may be connected to a source of voltage, such as +V2 which may be of a magnitude, for example, of 13 volts. The Zener and the resistor may raise the voltage of transistor 17 by approximately 3 volts thereby acting as a threshold to insure that spurious noise will not drive transistor 17 into conduction. A capacitor 26 may be connected across Zener 24 to supply the Zener with photocurrents during radiation thereby insuring that the Zener will quickly recover from the effects of the radiation. Amplifier 12 acts as a threshold device and amplifies any voltage pulse of a magnitude over approximately 3 volts, the threshold of Zener 24, and applies these pulses to blocking oscillator 13.

Blocking oscillator 13 may advantageously include windings 27, 28 and 29 wound around a single core with polarities as shown. Winding 27 may be connected between the collector of transistor 17 and the +B2 source terminal and, as hereinafter explained, may be shunted by a unidirectional switch such as a diode 30. Similarly, winding 28 may interconnect the collector of a transistor 31 and a voltage source terminal and may be shunted by a unidirectional switch such as a diode 28a. By way of example, the voltage source terminal may be connectable to a source of voltage, −V3, which may be of a magnitude equal to −12 volts. Winding 29 may be connected between the base of transistor 31 and the −V1 voltage source. A capacitor 32 may be connected in parallel with winding 29 to minimize the effects of short transients on the blocking oscillator.

As hereinafter explained, blocking oscillator 13 may actuate relay driver 14 by way of blocking oscillator lead 15 connected therebetween. Relay driver 14 may be any desirable switch element or the like adapted to be actuated by the blocking oscillator to connect a voltage source to the relay. Thus, relay driver 14 may include a transistor 34 connected between the −V1 source and a core winding 35 of relay 11. As hereinafter more fully described, the duty cycle of voltage supplied to the core winding by relay driver 14 is augmented by flyback path 16.

The output of the blocking oscillator during normal or regenerative operation may be taken across a resistor 33 connected between source −V1 and the emitter of transistor 31. Similarly, the flyback path may include a switch component 16a connected between the blocking oscillator and relay 11. By way of example, switch component 16a may be a transistor, the emitter of which is connected to the base of transistor 31, the base connected to the −V1 source and the collector connected to one end of the core winding 35 via lead 16. The other end of winding 35 may be connected to source +V2 while an unidirectional switch, such as diode 36, and a resistor 37 may be connected in parallel with the winding. Diode 36 and resistor 37 operate to keep the field in the relax winding from collapsing between input pulses.

The operation of the relay system may best be understood by reference to FIGS. 2 and 3 of the drawing wherein FIG. 3 a shows input pulses 38–43, separated by time $T_1$, supplied to terminals 10a and 10b from an external source (not shown). As hereinbefore explained, it may be desirable to effect relay operation after a predetermined number of input pulses to insure that a spurious gamma pulse will not prematurely close the relay. Often, however, the repetition rate of the input pulses is fixed. In operation it may be desired to effect relay switching at a time $T_2$ after the application of the first pulse input. Referring to FIG. 3 a it is readily apparent that this time, I', may correspond to the application of six input pulses. The relay may be such, however, as to require more than six pulses, absent the instant invention, to effect switching. Since the repetition rate $T_t$ may be assumed fixed, the relay can be closed at $T_2$ only if the duty cycle responsive to the input pulses is increased (since the number of input pulses within the $T_2$ time period is assumed fixed by the fixed repetition rate). It is often impractical or impossible to increase the blocking oscillator "ON" output at lead 15 to increase the duty cycle. The present invention, therefore, achieves the desired increase in duty cycle by utilizing the flyback in the blocking oscillator to help actuate the relay.

Referring to FIG. 3 b of the drawing, showing the voltage at the base of transistor 31, the operation of the blocking oscillator is shown as including regeneration or "ON" time periods 44, 46, 48, 50, 52 and 54 of time duration $T_3$, respectively. More specifically, input pulse 38 applied to terminals 10a and 10b will be passed by way of circuit components 18, 19 and 20 to turn on transistor 17 assuming, of course, that the threshold level of Zener 24 is surpassed. Conduction of transistor 17 will cause current to flow in blocking oscillator winding 27 which will initiate regenerative operation of the blocking oscillator as known by those skilled in the art.

Referring to FIG. 3 c of the drawing, which shows the current in the base of transistor 31, it is readily apparent by examining the base current pulse 56, that during the regenerative or "ON" pulse 44 transistor 31 is driven into conduction to supply a current pulse to the base of transistor 34 of relay driver 14 via lead 15. The application of a current pulse to the base of transistor 34 during interval 56 renders the relay driver transistor conductive to complete a path including source +V2, relay winding 35, the collector-emitter of transistor 34 to the −V1 source to supply voltage to the winding. Referring to FIG. 3 e of the drawing, which shows the voltage across relay winding 35, it is readily apparent that a voltage equal in magnitude to the difference between the +V2 and −V2 sources (for example, the +13v− (−21v) or 34 volts) is applied across the winding (neglecting, of course, the drop across transistor 34). This is shown as voltage pulse 68a in FIG. 3 e. Similarly, regeneration pulse 46 of the blocking oscillator renders transistor 31 conductive, as indicated by base current pulse 58, thereby supplying current to the relay driver transistor to turn the latter on hence enabling voltage pulse 70a to be supplied to the relay winding. This is repeated for corresponding pulses 48, 50, 52 and 54 which turn on transistor 31 as indicated by transistor 31, base current 60, 62, 64 and 66 to supply voltage 72a, 74a, 76a and 78a to the winding.

As hereinbefore explained, however, voltage pulses 68a, 70a, 72a, 74a, 76a and 78a may be insufficient to actuate the relay in the required time $T_2$. The voltage duty cycle is thereby augmented by the flyback of the blocking oscillator.

As may be seen in FIG. 3 b of the drawing, the blocking oscillator provides regeneration or "ON" operation of duration $T_3$ during pulses 44, 46, 48, 50, 52 and 54. Since the current cannot instantaneously change in the windings 27–29 when regeneration turns the blocking oscillator off, flyback causes the voltages across the windings to change. As a result of this change in voltage, the voltage at the base of transistor 31 is rendered negative as indicated at 45, 47, 49, 51 and 53 for a time $T_4$. Of course, diodes 28a and 30 may be connected across windings 28 and 27 to clamp the flyback voltage to insure that the voltage change will not damage transistors 17 or 31.

The drop in voltage at the base of transistor 31 causes transistor 16a to be rendered conductive. More specifically, it is apparent from current pulse 57 of FIG. 3 d of the drawing (which shows the current through the emitter of transistor 16a) that during flyback interval 45 transistor 16a goes into saturation and then goes through its active region reaching cutoff when blocking oscillator turns on at pulse 46. Similarly, flyback intervals 47, 49, 51 and 53 cause conduction of transistor 16a as indicated by emitter current pulses 59, 61, 63, 65 and 67. Conduction of transistor 16a during flyback completes a voltage path from source +V2 winding 35, the collector-emitter of transistor 16a, winding 29 to the −V1 source allowing voltage pulses 68b, 70b, 72b, 74b, 76b and 78b to be impressed across the relay winding during the respective flyback intervals. Thus, as shown in FIG. 3 e, the duty cycle of the voltage supplied to the winding is increased by the 68b, etc. pulses, almost 100%

The flux in the relay winding is shown in FIG. 3 f of the drawing. Since the voltage across the coil is equal to the time rate of change of flux, the flux is proportional to the integral of the voltage or, graphically, the flux is proportional to the area under the voltage curve in FIG. 3 e. It is readily apparent that the voltage supplied to the relay is now sufficient to supply flux in the relay of sufficient magnitude to overcome the flux threshold and close the relay contacts (not shown), as indicated in FIG. 3 g which shows the relay actuation, during the required time interval $T_2$.

Referring to FIG. 3 a, gamma bursts I, II and III are indicated. If a gamma burst occurs at I, sufficiently before input pulses 38–43, the pulse may fire the blocking oscillator 13 but, as indicated in the drawing in dashed line, this is unable to supply adequate voltage to the relay so that the flux will increase but then decay without reaching the required flux threshold level insuring that the relay will not be actuated. Similarly, gamma burst III, occurring while the blocking oscillator is already triggered, will not affect relay closure. The effect of gamma pulse II, occurring within time $T_1$ before input pulse 38 will merely shift closure of the relay by an amount equal to $T_1$ as shown in FIG. 3 g by triggering the blocking oscillator at pulse 79 as if an input pulse had been present.

Thus, the effect of a single gamma burst, without the input pulse, is such as not to affect relay operation and, occurring in concert with the input pulses, will at worst shift relay actuation by a maximum amount, in time, approximately $T_1$.

Obviously, numerous modifications and variations of the present invention are possible in light of the above teachings. For example, it may be possible to substitute any device, such as an RC network, which acts to integrate the current supplied to it, as the load. It is therefore to be understood that within the scope of the appended claims the invention may be practiced otherwise than as specifically described herein.

What is claimed as new and desired to be secured by Letters Patent of the United States is:

1. A radiation tolerant relay control system comprising
   means for receiving input signals;
   means for amplifying said input signals of a predetermined polarity and at least a predetermined magnitude;
   blocking oscillator means responsive to said amplified input signals for providing control signals;
      means responsive to said control signals for alternately effecting completion of at least one of a plurality of circuit paths to a relay winding including
         first switch means for completing a first circuit path during regeneration of said blocking oscillator means,
         second switch means for completing a second circuit path during flyback of said blocking oscillator means thereby effecting relay actuation only when said amplified signals exceed a predetermined number within a predetermined time interval and precluding premature and spurious relay actuation when said system is subjected to a radiation environment.

2. A radiation tolerant relay control system according to claim 1 wherein
   said first and said second switch means are transistors.

* * * * *